United States Patent [19]

Taghon

[11] 4,391,341

[45] Jul. 5, 1983

[54] SUPPORTING CHASSIS FOR A WORKING MACHINE, SUCH AS A HYDRAULIC SHOVEL

[75] Inventor: Daniel Taghon, Cinqueux, France

[73] Assignee: Poclain, Le Plessis Belleville, France

[21] Appl. No.: 192,924

[22] Filed: Oct. 1, 1980

[30] Foreign Application Priority Data

Oct. 11, 1979 [FR] France .................................. 79 25381

[51] Int. Cl.³ .............................................. B62D 55/00
[52] U.S. Cl. .................................. 180/9.2 R; 180/6.7; 305/16
[58] Field of Search ................. 280/781, 762; 180/6.7, 180/9.2 R; 305/16; 281/781

[56] References Cited

U.S. PATENT DOCUMENTS

| | | | |
|---|---|---|---|
| 2,710,222 | 6/1955 | Barenyi | 296/28 |
| 3,529,687 | 9/1970 | Pensa | 180/6.7 |
| 3,710,950 | 1/1973 | Pottorff et al. | 280/762 |
| 4,249,625 | 2/1981 | Palm | 180/6.7 |

*Primary Examiner*—Richard A. Bertsch
*Attorney, Agent, or Firm*—Mason, Fenwick & Lawrence

[57] ABSTRACT

The invention relates to a supporting chassis for a working machine, constituted by a central frame assembled to two longitudinal side-members.

Each side-member is essentially constituted by a metal sheet which is bent to form an overturned V and by a plate, closing off the said V, which is fitted to the lower ends of the sides of the overturned V.

The invention finds an application as a supporting chassis for a hydraulic shovel.

10 Claims, 6 Drawing Figures

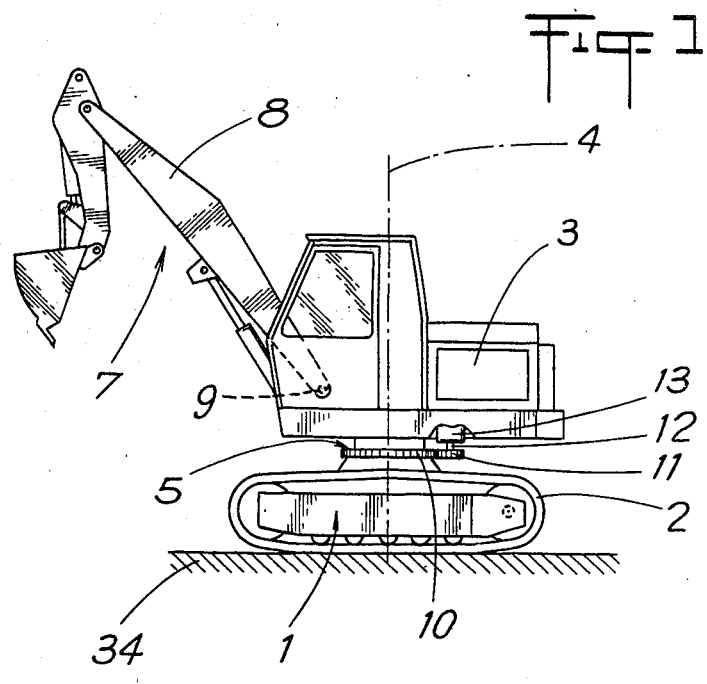
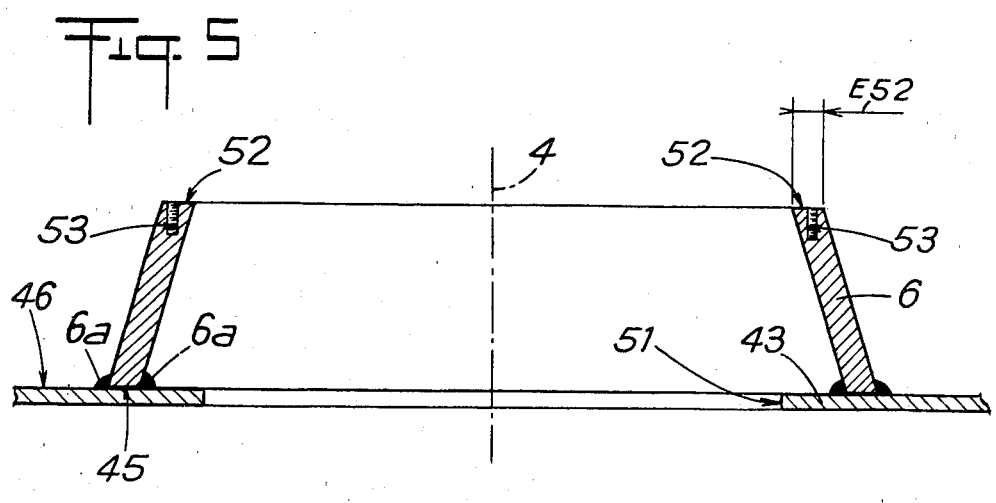

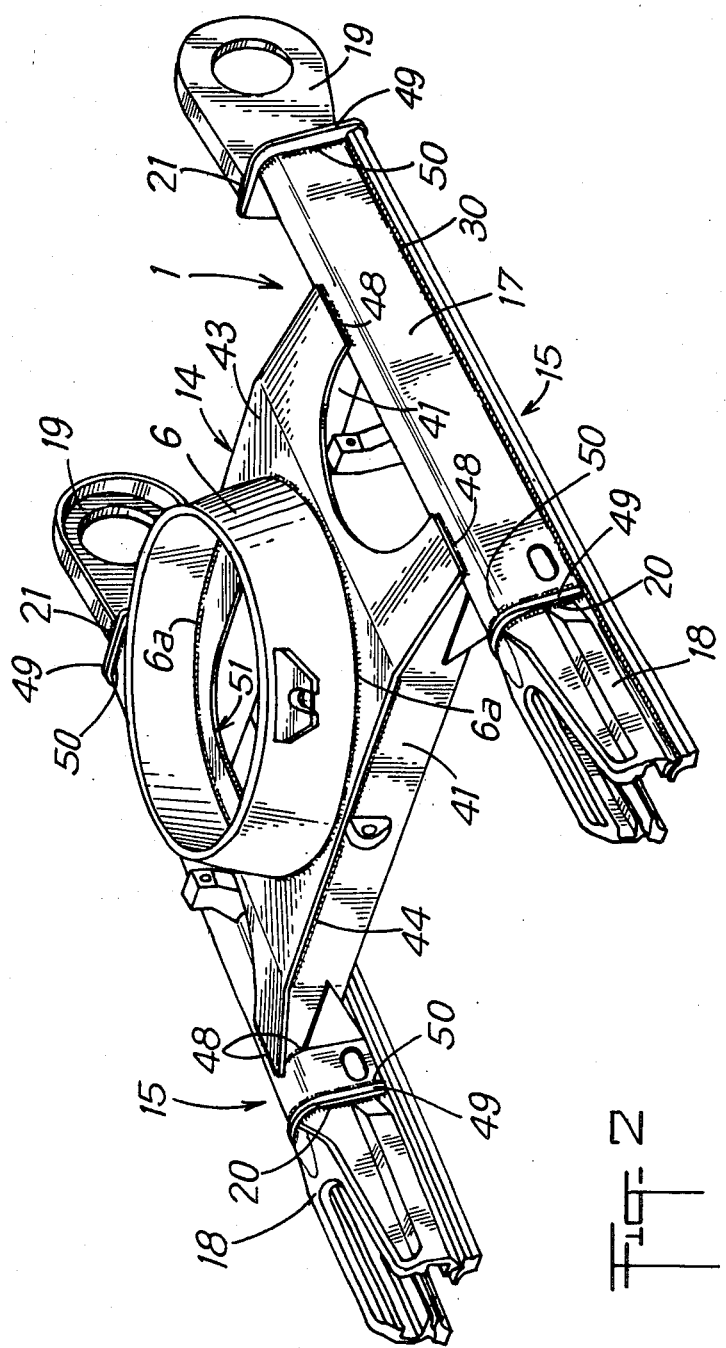

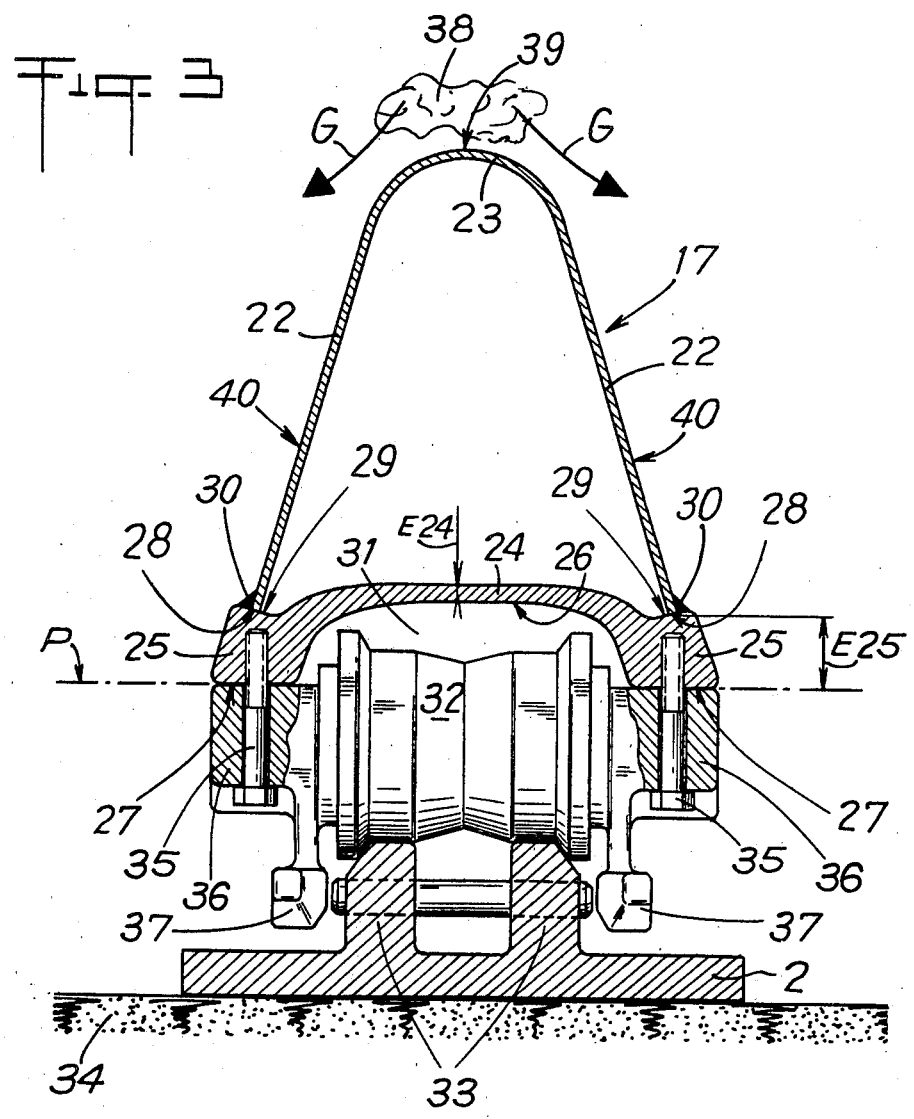

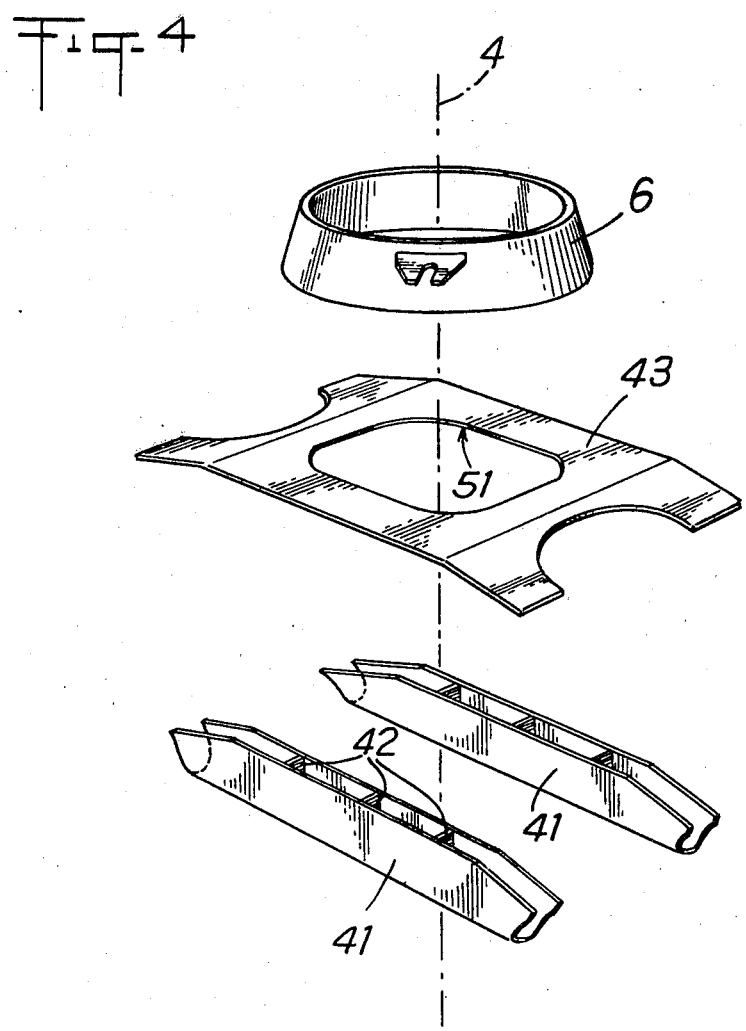

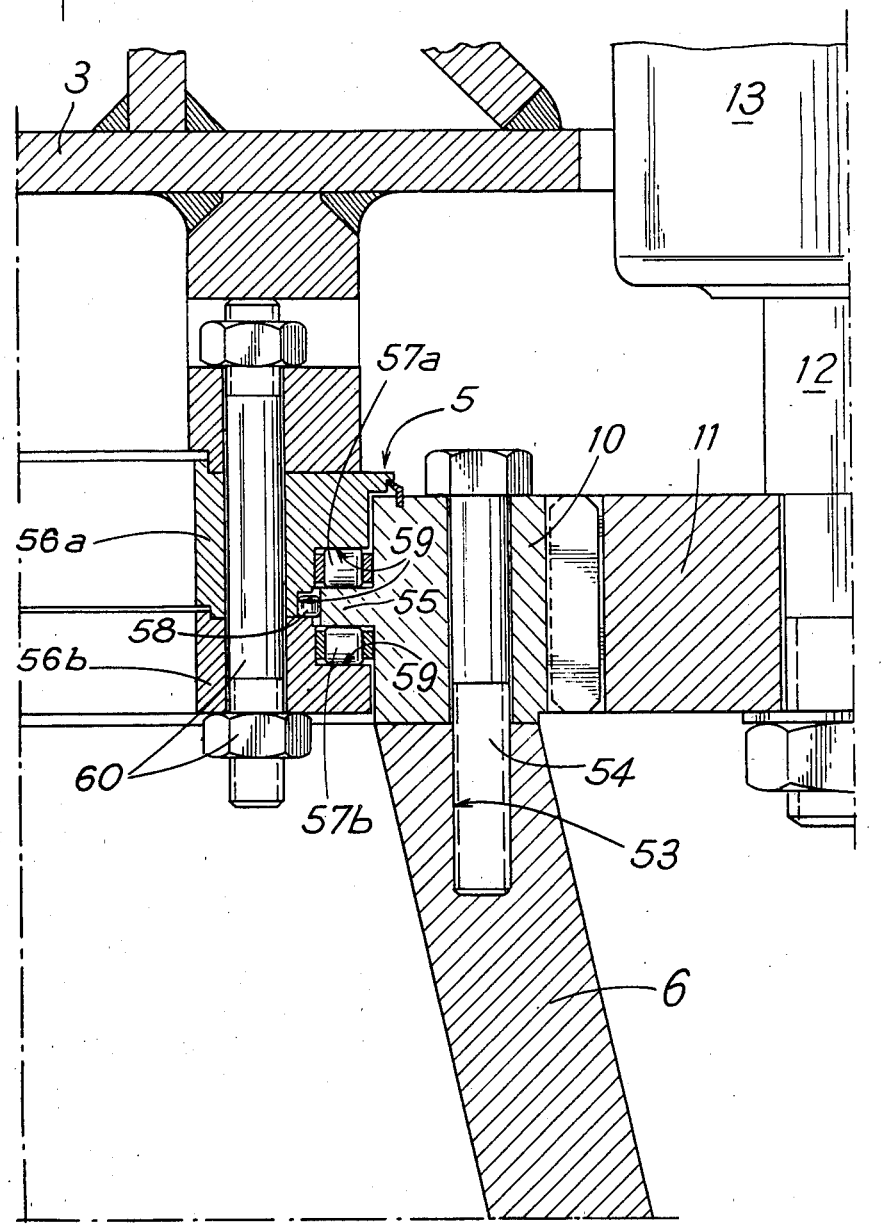

SUPPORTING CHASSIS FOR A WORKING MACHINE, SUCH AS A HYDRAULIC SHOVEL

A working machine, such as a hydraulic shovel in the field of public works, and such as a travelling crane in the field of handling appliances, comprises a chassis supporting its working equipment. Said supporting chassis constitute the link between the working gear and the ground, on which, on the one hand, the members ensuring the displacement of the machine—whether wheels or caterpillar tracks—are mounted, and on the other hand, on which the said working equipment is also mounted.

Said supporting chassis comprises, amongst other elements, a central frame assembled to two side-members. These are generally of parallelepipedal shape, which has certain disadvantages. For example, the natural rigidity in particular, under bending and twisting stresses, is insufficient so that the mechanical elements fitted on such side-members will be subject to relative movements which interfere with their operation. This is particularly the case with caterpillar track idle rollers when said rollers are fitted on the side-members. From another standpoint, it is noted that the substantially horizontal upper faces of the parallepipedal side-members encourage various materials or refuse, to deposit which can cause damages, such as clogging of the chains driving the caterpillar tracks of a public works machine. Finally, also to be noted is the vulnerability of the lower plates of known side-members, whose edges are projecting but not reinforced.

A new type of supporting chassis had to be designed, in order to overcome the aforesaid disadvantages. And this is precisely the object of the present invention which proposes a new supporting chassis which is sufficiently rigid and has a greater mechanical resistance than already existing supporting chassis have.

The invention therefore relates to a supporting chassis for a working implement, such as a hydraulic shovel, constituted by a central frame fitted to two longitudinal side-members.

Each side member is essentially constituted by a metal sheet which is bent to form an overturned V and by a plate, closing off the said V, which is fitted to the lower ends of the sides of the overturned V.

Advantageously, the following arrangements are preferred:

the closing plate is rolled;

said closing plate is joined to the sides of the overturned V-shaped sheet by contact of the edges of the lower ends of the sides of the overturned V with the upper face of the closing plate and by welding the said edges to the said closing plate;

said closing plate comprises a central zone of predetermined thickness, which is flanked on each one of its sides with a rim of material substantially thicker than the said predetermined thickness;

the edges of the lower ends of the sides of the overturned V are in contact with the upper faces of the thick rims bordering longitudinally the closing plate;

the lower faces of the rims bordering the closing plate longitudinally are trued up so as to constitute at least a supporting face for fitting the supports of the runners, which in turn support the caterpillar tracks of a chassis;

the lower faces of the two rims of one side-member are co-planar;

two cross-plates are placed in contact with the ends of each side-member and are welded to the overturned V-shaped sheet of metal and to the closing plate thus making a tightly sealed compartment of the said side-member.

The invention will be more readily understood on reading the following description with reference to the accompanying drawings, in which:

FIG. 1 is an elevational view of a hydraulic shovel comprising a supporting chassis according to the invention;

FIG. 2 is a perspective view of the chassis supporting the shovel shown in FIG. 1;

FIG. 3 is a cross-sectional view of a side-member of the supporting chassis shown in FIG. 2;

FIG. 4 is a perspective view before assembly, of the elements constituting the central part of the supporting chassis shown in FIG. 2;

FIG. 5 is an axial cross-section of the upperstructure support of the chassis shown in FIG. 2; and, FIG. 6 is an axial cross-section showing in detail how the "runner ring" of the shovel of FIG. 1 is mounted on the upperstructure support shown in FIG. 5.

The mechanical shovel shown in FIG. 1 is constituted by a supporting chassis 1 fitted with caterpillar tracks 2, and by an upperstructure or turret 3 which is mounted for rotation about a vertical axis 4 with respect to the supporting chassis 1, by means of a "runner ring" 5 mounted on a turret support 6, said turret support being integral with the supporting chassis 1, and, by a working implement 7, whose boom 8 is mounted on the turret 3 for pivoting about a horizontal axis 9. A toothed wheel 10 is fitted on the support 6 and meshes with a pinion 11, which is fast in rotation with the output shaft 12 of a hydraulic driving engine 13 fitted on the turret.

Said supporting chassis is constituted by:

a central frame 14, two side-members 15 and, the turret support 6, these different elements being assembled as will be described subsequently.

Each side-member 15 comprises a central part 17 and two end parts 18 and 19, which are fitted thereon by welding in 20 and 21, respectively. The end parts are provided to allow, one, 18, the fitting of the wheel controlling the tension of the chain driving the corresponding track, the other 19, the fitting of the chain-pulley and of the engine driving the track, and they are of a known type, not requiring to be described in any particular way.

The central part 17 of a side-member 15 is constituted by a bent sheet of metal, whose cross-section is in the form of an overturned V with two flanks 22 diverging downwardly and showing a noticeable obliqueness, of the order of 75° in the illustrated embodiment, with respect to the horizontal, both flanks being joined together at their top end by a cylindrical dome 23. A lower plate gives the possibility of closing the V, and is composed of a central zone 24, of given thickness E24, and two rims 25, placed on each side of the central zone 24 and of the thickness E25, which is clearly superior to the thickness E24 of the central zone that they border. In the illustrated example E25=5 to 6 times E24.

It is further noted about the lower plate 24–25, that, on the one hand, the lower face 26 of its central zone 24 is concave, and on the other hand that the lower faces of its side rims 25 are plane and co-planar (plane P).

The lower edges 28 of the flanks 22 are in contact with the upper face 29 of the corresponding rim 25 and are welded thereto in 30. Moreover, the combination of the inherent flatness of the lower faces 27 with the concavity of the lower face 26 of the central zone 24, permits, on the one hand, to position the idle runners 32 of the chains 33 driving the tracks 2 resting on the ground 34, and on the other hand, to fix, by way of a screw 35, the bearings 36 of the rotary assembly of the said runners 32. The detailed constititution of the runners 32, of the guiding bosses 37, of the driving chains 33 and, of the bearing 36 for said runners is known for example from French Pat. No. 79 17 019. It is to be noted that waste materials 38, such as sludge or stones, which would tend to accumulate on the upper face 39 of the dome 23—forming the top of the overturned V—would only slide (arrows G) along their outer faces 40 because of the great obliqueness of the flanks 22 and fall back on the ground 34.

Two cross-plates 49 are placed at the ends of the central part 17 of each side-member and are welded (in 50) to the end edges of the flanks 22, of the dome 33, and, to the lower closing plate 24-25, thereby making each central part 17 into at least a tightly sealed compartment. The end parts 18, 19 are welded (in 20 and 21) to the said cross-plates 49.

Advantageously, the lower closing plate 24-25 is obtained by rolling, the rims 25 and the central zone 24 being both from the same piece of raw material.

The central part 14 is constituted by:
two arms 41, each one composed of a bent sheet of metal reinforced by inner gussets 42,
an upper plate 43 which covers the arms 41 and is welded thereto (44), and,
the support 6 of the turret constituted by a thick plate, which is bent into a truncated cone shape, and arranged so that the axis of the said truncated cone is blended with the axis of rotation 4 of the turret 3, the large base of the truncated cone being constituted by the lower edge 45 of the metal sheet, resting on the upper face 46, which is flat in that part of the upper plate 43 of the frame, and being welded (6a) to said upper plate.

The ends of the arms 41 and those, adjacent, of the upper plate 43 of the central frame are also wleded (48) to the central parts 17 of the side-members to complete the constitution of the supporting chassis 1.

The upper plate 43 of the central portion comprises in its centre a recess 51 which is placed so as to face the central opening defined by the support 6.

Said support 6 is constituted by a sheet of metal, thick enough to have a mechanical strength making it virtually indeformable, this, of course, combined with the adopted truncated cone shape. The thickness E52 of the upper edge 52 of the support 6 is also such that tapped holes 53 can be provided in the support 6, which tapped holes issue into the upper edge 52 and permit the fitting of the driving toothed wheel 10 and of the "runner rings" 5 by means of screws 54.

The actual constitution of the "runner ring" 5 is known. In the illustrated embodiment, said ring is constituted such as described in French Pat. no. 74 06 509 and comprises two middle collars 56a, 56b, which are co-axial and provided with peripheral housings 59 designed to receive, on the one hand, a ring 55, integral with the toothed ring 10, and on the other hand, running wheels 57a, 57b and 58, which, being inserted between the said ring 55 and the said housings 59, create a rotary fitting of the collars 56a, 56b with respect to the toothed wheel 10. Bolts 60 secure the turret 3 to the two collars 56a, 56b.

The advantages of the embodiment described hereinabove are as follows.

Due to to its triangular cross-section, the central part 17 of the side-member, shows a remarkable mechanical resistance to bending and twisting stresses. The resistance to shocks of its lower part, which is conferred by the thick rims 25 is greater than that of simple flat sheets of a single uniform thickness. In addition, as we have already indicated, the removal of any materials 38 from the dome 39 to the ground 34 is well ensured, all the more so that the flanks 22 are joined in the welding area 30 to the rims 25 with virtually no edge that could hold back any soil or stones. Moreover, the closing plate 24-25, owing to the special shape that can be given thereto, facilitates the fitting of the runners 32, without any other parts being needed. Finally, the constitution of a girder into a sealed compartment is an advantageous feature if a satisfactory overall mechanical resistance is required.

The elements constituting the central part 17 of the side-member have been selected for the sake of economy. The flanks 22 are obtained by folding one metal sheet, and the closing plate 24-25 is obtained by rolling a piece of metal. The very few machining phases necessary are simple ones and therefore inexpensive, which does not in any way affect the efficiency of the arrangements recommended. For example, the judicious provision of extra thicknesses (rims 25), and the very resistant general constitution of the central part 17, make it unnecessary to use most of the many gussets of reinforcements used in prior techniques. Substantial reduction of the weight of the side-members is thus obtained.

The invention is not limited to the illustrated embodiment but on the contrary covers any variants that may be made thereto without departing from the scope and the spirit thereof.

What is claimed is:

1. Supporting chassis for a working machine such as a hydraulic shovel, comprising two longitudinal side-members, preferably two lateral side-members, each side member being essentially constituted by a metal sheet which is bent in such a way that its cross-section presents a downward oriented concavity, and by a plate closing off the bent metal sheet, the lower edges of said metal sheet being secured to said plate; the improvement wherein said plate is monobloc and obtained by rolling and comprises a central zone of predetermined thickness, which is flanked on each one of its sides with a monobloc rim of material of thickness between opposite lateral surfaces of each rim substantially greater than the predetermined thickness adequate to receive upwardly directed fixing screw screwed therein, and wherein the the lower edges of the said metal sheet are in contact with the upper faces of the thick rims bordering longitudinally the closing plate.

2. Supporting chassis according to claim 1, wherein the said lower edges of said bent metal sheet are welded to the closing plate.

3. Supporting chassis according to claim 1, wherein two transverse plates are placed in contact with the ends of each side-member and are welded to said bent metal sheet and to the closing plate thus achieving the shaping of the said side-member into a tightly sealed compartment.

4. Supporting chassis according to claim 1, wherein the cross section of the bent metal sheet is substantially in the shape of an overturned "V", the legs of which present a noticeable obliqueness with respect to the horizontal.

5. Supporting chassis for a working machine such as a hydraulic shovel, comprising two longitudinal side-members, preferably two lateral side-members, each side-member being essentially constituted by a metal sheet which is bent in such a way that its cross-section presents a downward oriented concavity, and by a plate closing off the bent metal sheet, the lower edges of said metal sheet being secured to said plate; the improvement wherein said plate is monobloc and obtained by rolling and comprises a central zone of predetermined thickness, which is flanked on each one of its sides with a rim of material of thickness substantially greater than the predetermined thickness, wherein the lower edges of the said metal sheet are in contact with the upper faces of the thick rims bordering longitudinally the closing plate and wherein the two longitudinal rims are joined together in the central zone of the closing plate, thereby conferring to the inner face of said plate a downward oriented concavity permitting at least the partial housing of guiding runners of track supports of a track chassis inside the space provided by the said concavity of the closing plate and further permitting direct fastening of supports of the guiding runners on said closing plate.

6. Supporting chassis according to claim 5, wherein the lower faces of the longitudinal rims of the closing plate are trued up so as to constitute at least a supporting face for fitting supports of guiding runners which support tracks of a track chassis.

7. Supporting chassis according to claim 6, wherein said lower faces of said longitudinal rims of one side-member are co-planar.

8. Supporting chassis for a working machine such as a hydraulic shovel, comprising two longitudinal side-members, preferably two lateral side-members, each side-member being essentially constituted by a metal sheet which is bent in such a way that its cross-section presents a downward oriented concavity, and by a plate closing off the bent metal sheet, the lower edges of said metal sheet being secured to said plate; the improvement wherein said plate is monobloc and obtained by rolling and comprises a central zone of predetermined thickness, which is flanked on each one of its sides with a rim of material of thickness substantially greater than the predetermined thickness, wherein the lower edges of the said metal sheet are in contact with the upper faces of the thick rims bordering longitudinally the closing plate and are welded to the closing plate, and wherein the two longitudinal rims are joined together in the central zone of the closing plate, thereby conferring to the inner face of said plate a downward oriented concavity permitting at least the partial housing of guiding runners and of track supports of a track consists inside the space provided by the said concavity of the closing plate and further permitting direct fastening of supports of the guiding runners on said closing plate.

9. Supporting chassis according to claim 8, wherein the lower faces of the longitudinal rims of the closing plate are trued up so as to constitute at least a supporting face for fitting supports of guiding runners which support tracks of a track chassis.

10. Supporting chassis according to claim 9, wherein said lower faces of said longitudinal rims of one side-member are co-planar.

* * * * *